Oct. 17, 1933.   A. R. LAFFERTY   1,931,005
AUTOMATIC SORTING MACHINE
Filed April 4, 1929   9 Sheets-Sheet 4

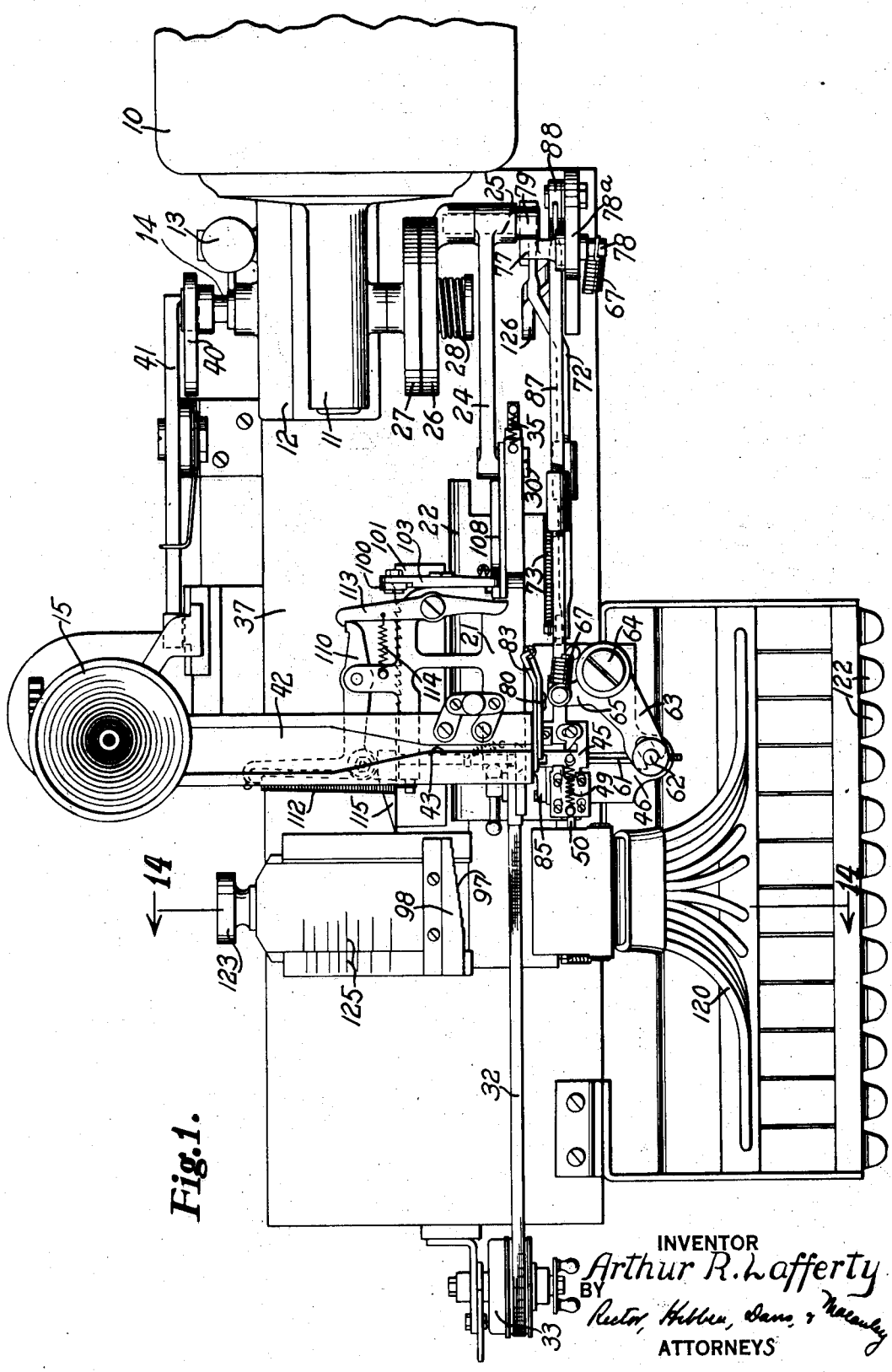

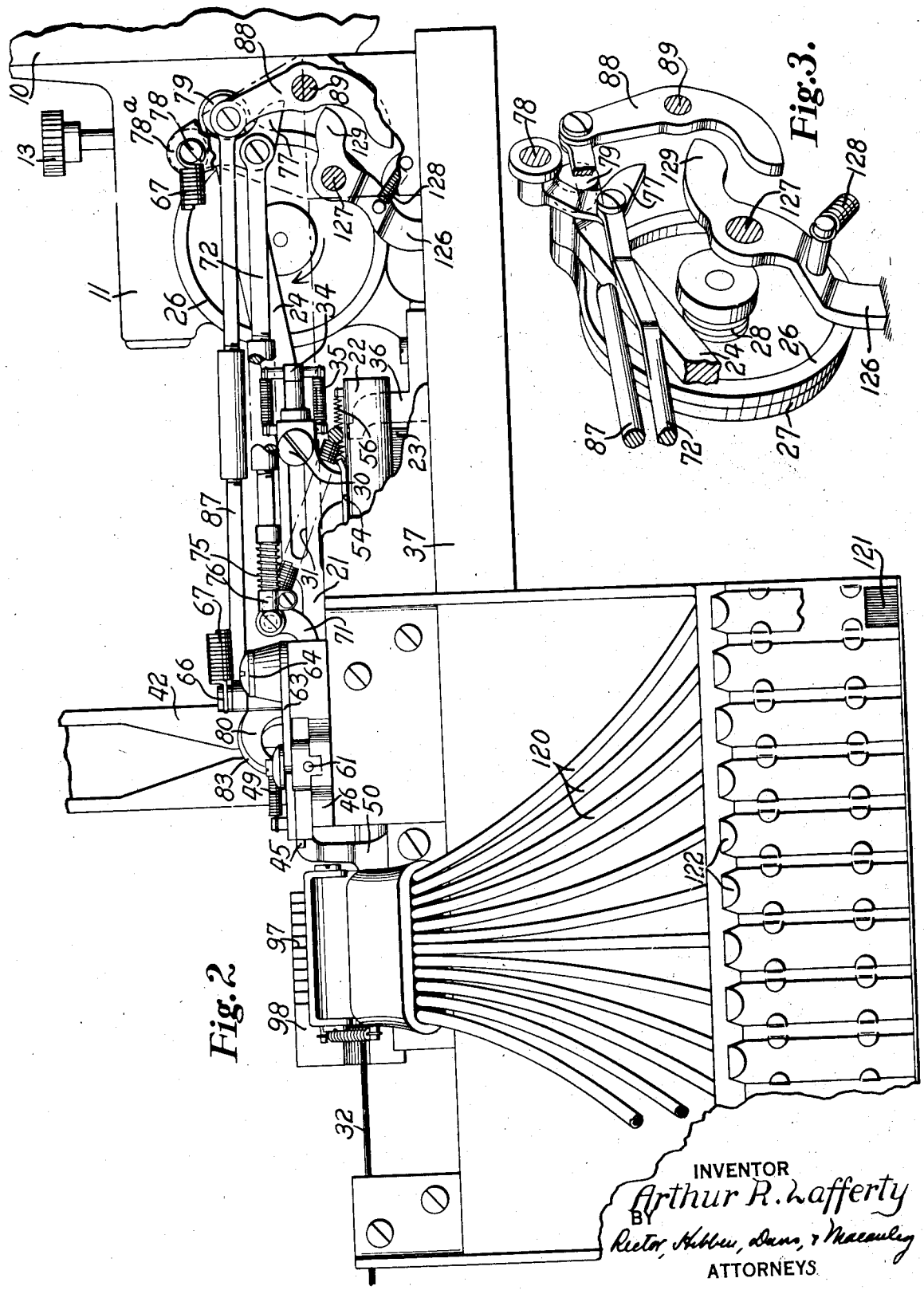

INVENTOR
Arthur R. Lafferty
BY
Rector, Hibben, Davis, & Macauley
ATTORNEYS

INVENTOR
Arthur R. Lafferty
BY
ATTORNEYS

Oct. 17, 1933.  A. R. LAFFERTY  1,931,005
AUTOMATIC SORTING MACHINE
Filed April 4, 1929    9 Sheets-Sheet 6
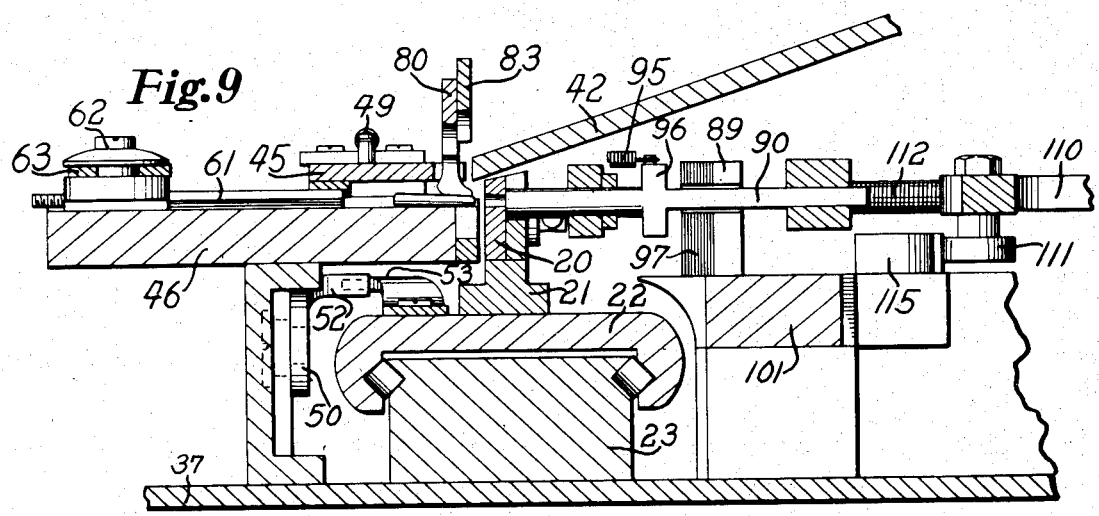
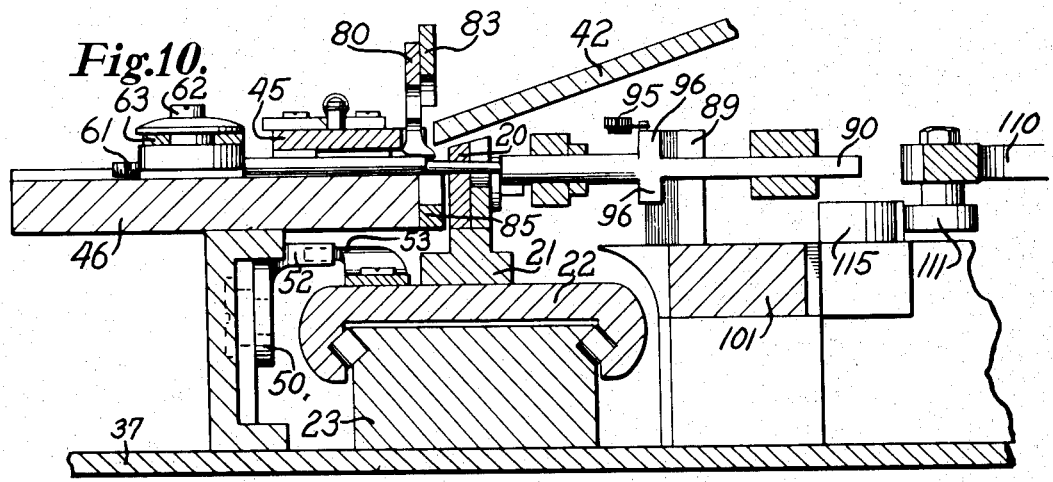
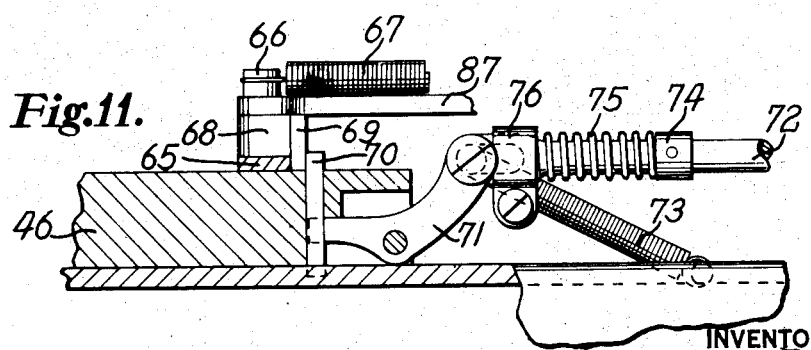
INVENTOR
Arthur R. Lafferty
BY
Rector, Hibben, Davis, & Macauley
ATTORNEYS

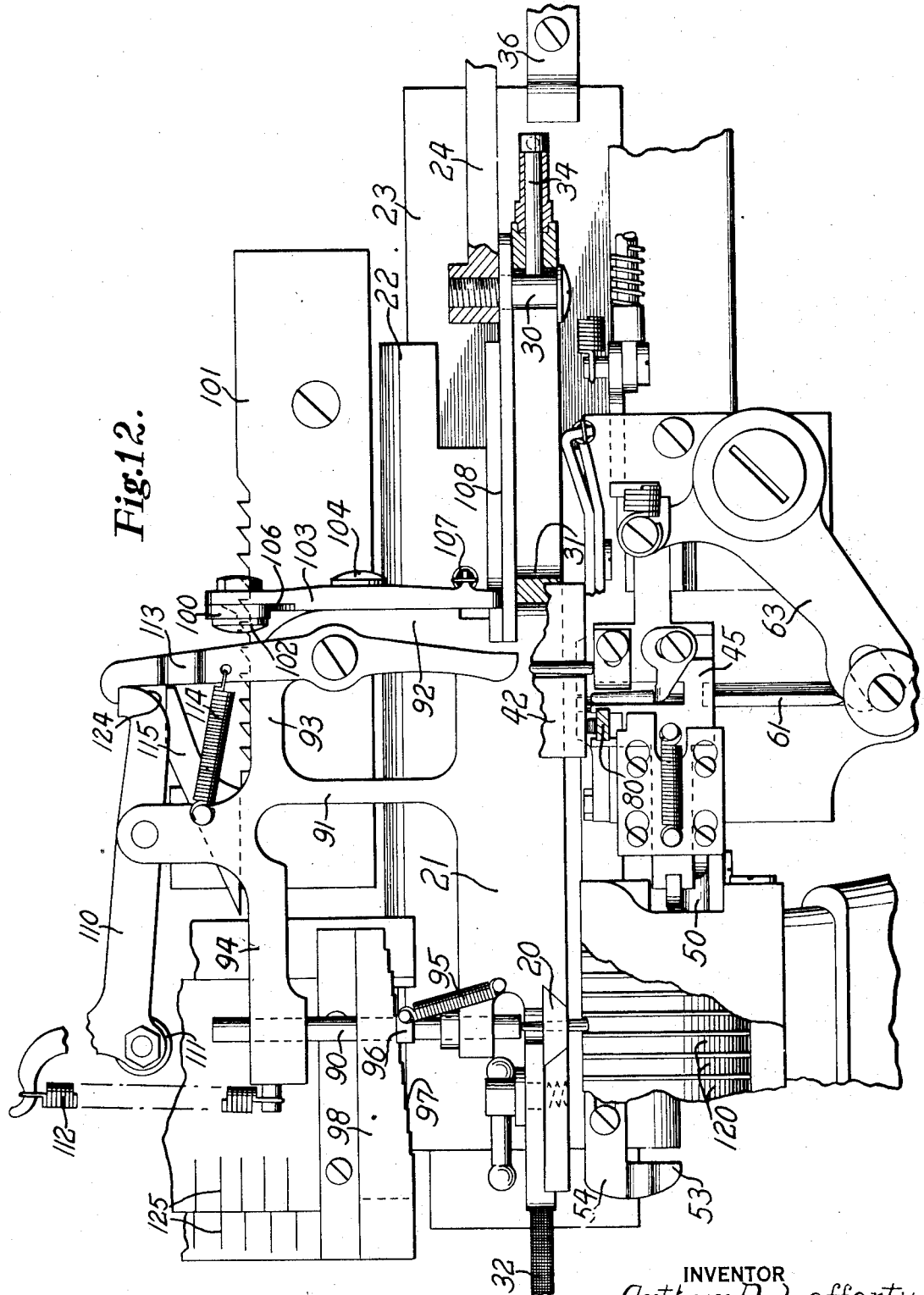

Oct. 17, 1933.                A. R. LAFFERTY                1,931,005
                         AUTOMATIC SORTING MACHINE
                     Filed April 4, 1929        9 Sheets-Sheet 8

INVENTOR
Arthur R. Lafferty
BY
Rector, Hibben, Davis & Macauley
ATTORNEYS

Oct. 17, 1933.    A. R. LAFFERTY    1,931,005
AUTOMATIC SORTING MACHINE
Filed April 4, 1929    9 Sheets-Sheet 9
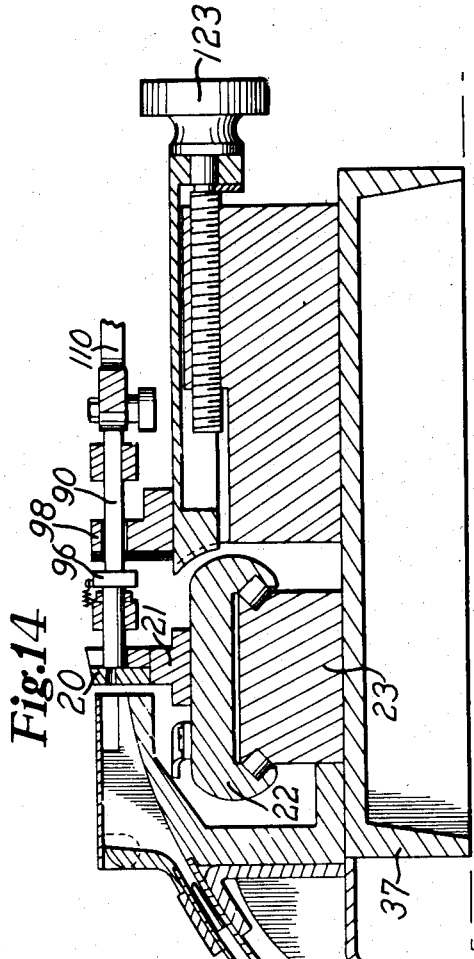
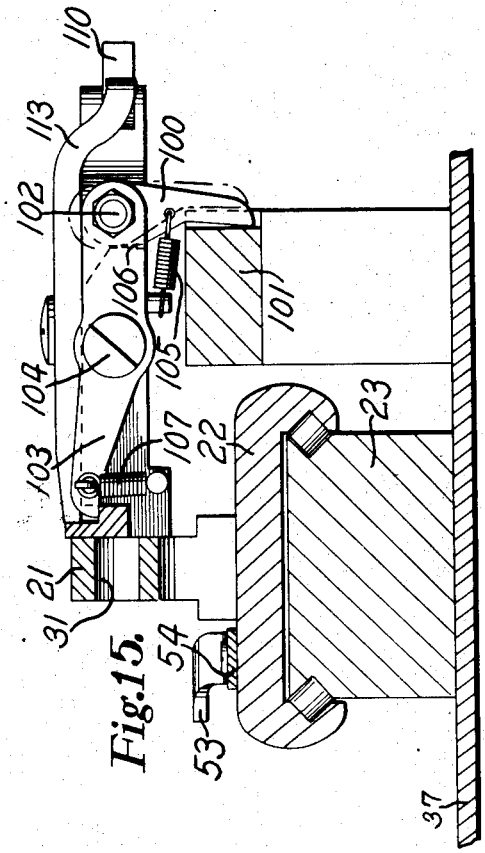
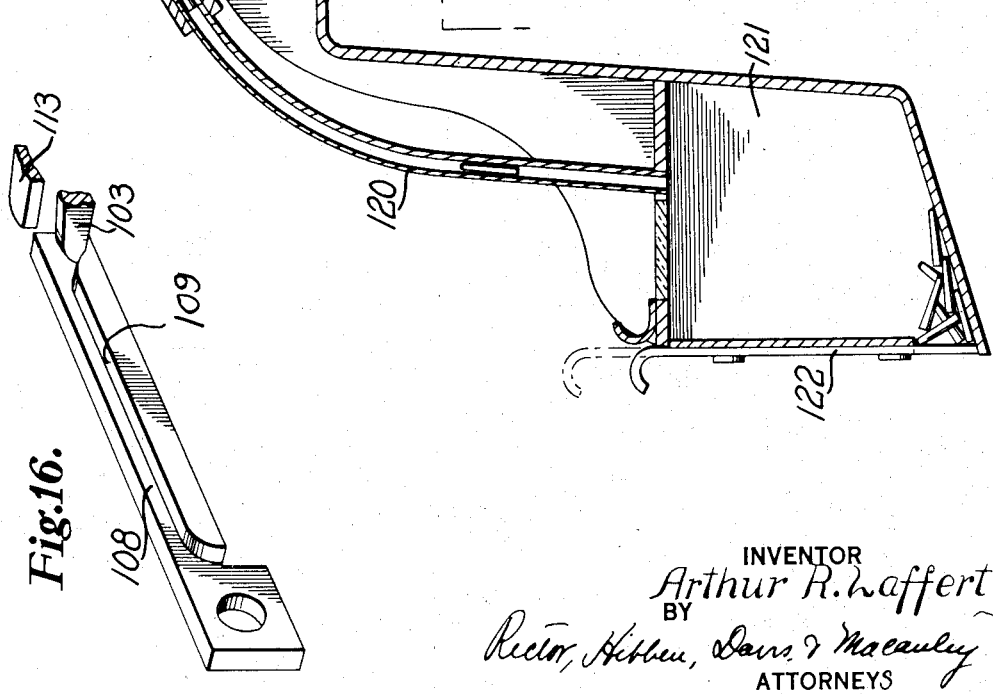
INVENTOR
Arthur R. Lafferty
BY
Rector, Hibben, Davis & Macauley
ATTORNEYS Patented Oct. 17, 1933

1,931,005

UNITED STATES PATENT OFFICE 1,931,005

AUTOMATIC SORTING MACHINE

Arthur R. Lafferty, Detroit, Mich., assignor to Burroughs Adding Machine Company, Detroit, Mich., a corporation of Michigan Application April 4, 1929. Serial No. 352,386

21 Claims. (Cl. 209—90)

This invention relates to an automatic sorting machine for sorting small articles, particularly articles such as tapered pins, tapered rollers and the like. The invention will be described as it is used to sort tapered pins, but it is to be understood that it can be used equally well with other articles, for example, tapered rollers for roller bearings. In fact, the articles to be sorted need not necessarily be tapered, as will be clear from the description of the machine.

Tapered pins are used to fasten hubs, bushings, and the like, onto shafts, by driving the tapered pins into aligned holes in the shaft and the hub or bushing. These holes are reamed out quite accurately to a given taper. When a pin has the same taper as the hole it goes into the hole nicely and neither end of the pin projects but, if the pin is too large or too small or if its taper is incorrect, one end of the pin will project and this end may not only be in the way of some other operating part but the fastening of the hub or bushing on the shaft may not be secure because the pin may not project across the joint between the shaft and bushing on one side. It is highly desirable that the pin should fit accurately so that neither end projects and in order that this may be accomplished the pins must be of absolutely correct size. The pins are made on automatic machines which are reasonably accurate but which do not always produce pins of exactly the same size and shape. A variation of a few thousandths of an inch will be enough to cause the pin to be a misfit.

In the case of tapered rollers used in roller bearings it will be appreciated that, if one of the rollers is of larger diameter than the others, the large roller will take most of the bearing pressure while, if one of the rollers is of smaller diameter than the others, it will take scarcely any of the bearing pressure. In order that the bearing may operate at maximum efficiency, each of the rollers should sustain an equal portion of the weight so that they will wear uniformly and so that the bearing will function with the least friction. It is therefore desirable that the rollers be gauged and sorted very accurately so that rollers of exactly the same size will be put in individual bearings.

Heretofore tapered pins have been sorted by hand. An operator inserts a tapered pin into a gauging die and then sights across the end of the pin to see what graduation is opposite the end of the pin. These graduations are only .024 apart and are difficult to read due to the closeness of the lines. Furthermore, inaccuracies are liable to occur because the gauge must be held exactly perpendicular to the eye of the operator. This old method is slow, uncertain, and does not permit very fine grading.

The present invention comprehends a machine that is entirely automatic and, in practice, it has been found that the machine will not only do the work of several hand operators but it will sort the pins into finer grades than is possible by hand sorting. For example, in sorting the pins by hand, a given lot of pins is usually sorted into only three sizes, whereas, with the present machine, the same pins are sorted into ten sizes.

The object of the invention is, therefore, to provide an improved automatic sorting machine.

A more particular object of the invention is to provide an automatic sorting machine that is especially adapted to sort tapered articles such as tapered pins, tapered rollers, and the like.

A further object is to provide an improved sorting machine that will automatically take articles from a hopper, automatically arrange them in given positions, automatically sort them, and automatically discharge them into different receptacles according to the size of the article, each receptacle containing only articles of one size.

Other and more particular objects of the invention will appear from the following specification and drawings.

An embodiment of the invention is shown in the accompanying drawings in which,—

Figure 1 is a plan view of the machine with the parts in normal condition;

Fig. 2 is a partial front elevation of the machine with the parts in normal condition;

Fig. 3 is a partial perspective view of the operating means showing the parts at the right-hand end of Fig. 2;

Fig. 9 is a partial section on the line 9—9 of

Figure 4:
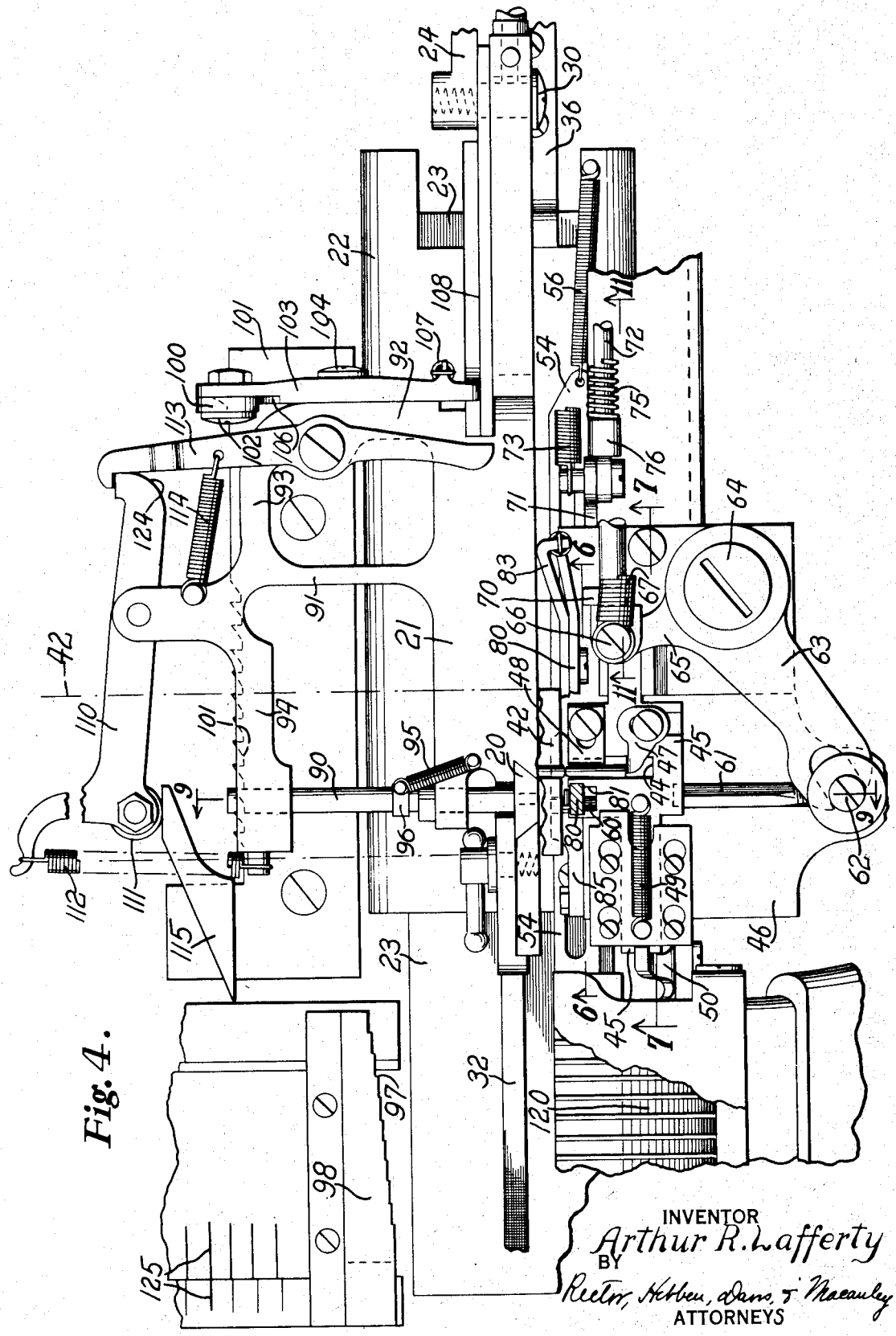
Fig. 4 is an enlarged partial plan view showing the parts in the positions they occupy when a tapered pin is delivered from the hopper into the receiving chamber.
Figure 13:
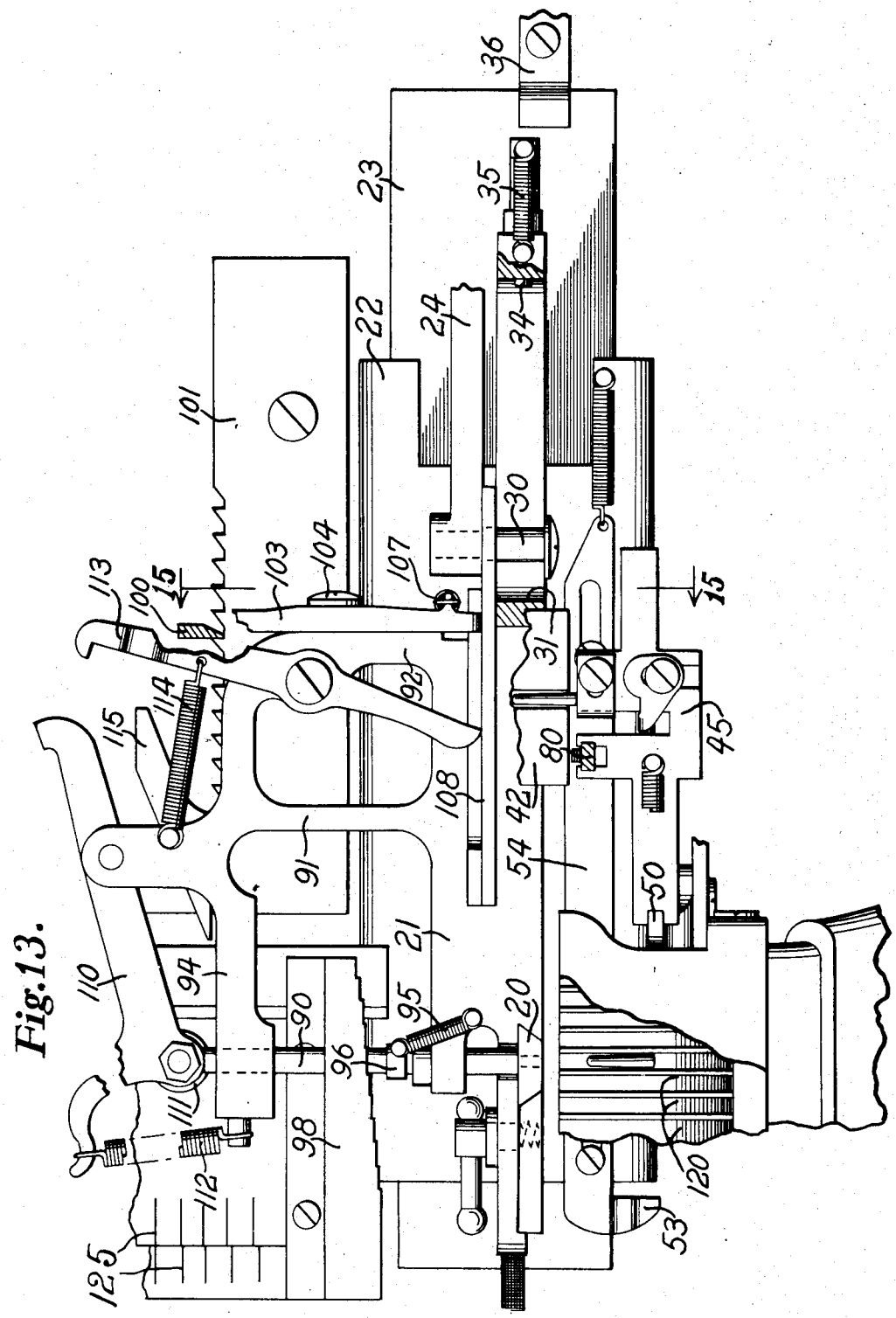

Fig. 4, the view showing a pin in the firing chamber and the gauging die in position to receive the pin;

Fig. 10 is a view similar to Fig. 9 showing the parts in the position they occupy after the pin has been driven into the gauging die;

Fig. 11 is a detail sectional view on the line 11—11 of Fig. 4 showing the construction of the releasing mechanism for releasing the hammer that drives the pin into the gauging die;

Fig. 12 is a partial plan view showing the gauging die moved to its discharging position and illustrating particularly the mechanism for arresting the die in differential positions;

Fig. 13 is a plan view similar to Fig. 12 illustrating the parts in the position they occupy after the pin has been ejected from the die;

Fig. 14 is a sectional view on the line 14—14 of Fig. 1;

Fig. 15 is a sectional view on the line 15—15 of Fig. 13 showing how the parts are held in position while a pin is being ejected.

Fig. 16 is a perspective view of a cam plate that controls certain functions of the machine.

Before explaining the machine in detail, its operation will be described in a general way so that the relation and function of the various parts may be more easily grasped as they are described.

In order that the machine may be easily understood, it may be said, in a general way, that the pins to be sorted are placed in a hopper from which they are automatically removed one at a time. Inasmuch as the pins are tapered it is necessary to arrange them relative to the gauging die so that the same end of the pin always faces the die. As each pin is taken from the hopper it is delivered to an apparatus that automatically arranges it in with the correct end pointing in a given direction and delivers it to a receiving chamber in the machine from which it is fed into a firing or feeding chamber. The pins are then automatically fed into a gauging die which has a tapered opening of a diameter and taper to which the pins should correspond, the die being constructed so that pins of the correct diameter and taper will go into it a given distance. If the pin is smaller than it should be, it will go into the die farther than a correct sized pin, whereas, if the pin is larger than should be, it will not go into the die as far as it should. When entering the die the pin sets a plunger to a position corresponding to the distance that the pin enters the die. The die is then automatically moved from a "receiving" to a "discharging" position, the exact discharging position being determined by the size of the pin in the die, that is, the plunger that is set by the pin engages a stepped stop which arrests the die in a position corresponding to the size of the pin. After the die has been arrested, the pin is automatically ejected into a chute, there being a different chute for each "discharging" position of the die so that when the die is arrested in a given position, the pins are always ejected into the same receptacle. After a pin has been ejected, the die returns to its "receiving" position where another pin is automatically inserted, the machine operating continuously and automatically without requiring any attention.

The machine is preferably driven by an electric motor 10 operating through a reducing gear contained in the housing 11 and a clutch in the housing 12, the clutch being thrown into and out of engagement by means of a hand lever 13. When the clutch is engaged a shaft 14 is rotated by the motor and this shaft drives both the delivery mechanism associated with the hopper 15 and the mechanism associated with the gauging die. For convenience the gauging die and the mechanism for operating it will be described first.

Gauging die and operating means therefor

Figure 8:
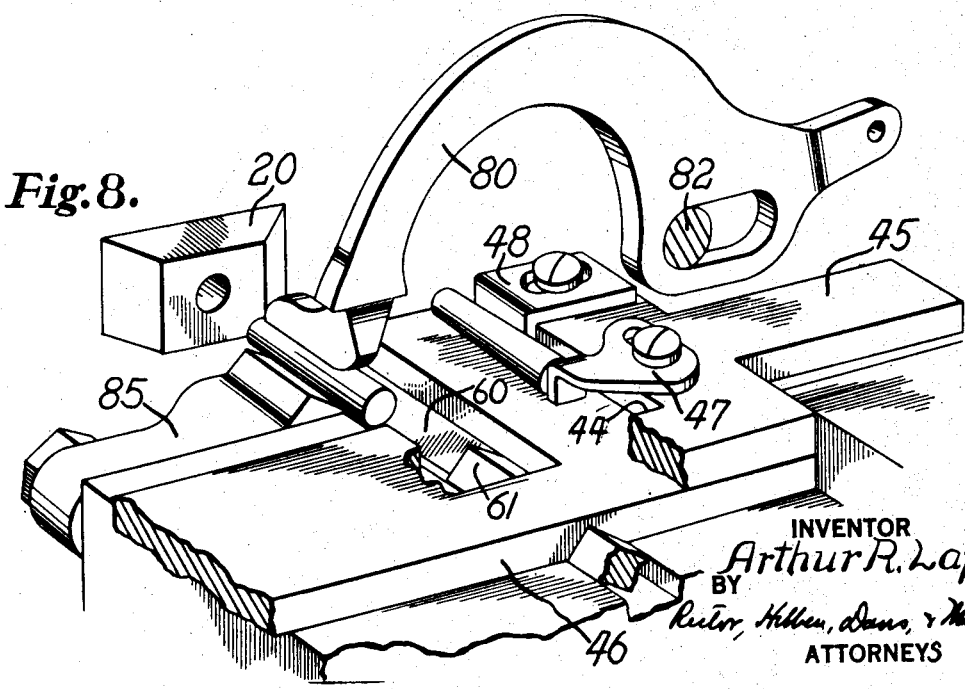
Fig. 8 is a partial perspective showing one pin in the receiving chamber and another in the firing chamber.

The gauging die comprises a steel block 20 (Figs. 4 and 8) having an opening therein of such size as to permit a pin of the desired size and shape to project through the die a given distance, such, for example, as illustrated in Fig. 10. A tapered pin of the proper diameter and taper will project through the die a given amount while pins of smaller or larger diameter or taper will project through the die to a greater or less extent. The steel block 20 is carried by a reciprocating slide 21 mounted on a carrier 22 (Fig. 10) which slides on the base plate 23. The slide 21 is reciprocated by a pitman 24 (Fig. 1) driven by a wrist pin 25 on a rotating driving disk 26. The disk 26 is maintained in frictional engagement with a second disk 27 on the shaft 14 by a spring 28, the arrangement providing a yielding connection between the motor and the pitman.

The connection between the pitman 24 and the slide 21 permits the pitman to move relative to the slide both forward and backward. Referring to Fig. 12 it will be observed that the pitman carries a pin 30 operating in a slot 31 in the slide 21. The slide itself is urged to the left as viewed in Figs. 1 and 12 by a tape 32 tensioned by a spring drum 33 illustrated at the left-hand side of Fig. 1, its speed of movement in this direction being controlled by the pitman 24.

As shown in Fig. 12, the pin 30 on the pitman 24 does not bear against the right-hand end of the slot 31 in the slide 21 but against a pin 34 urged to the left by two springs 35 which are illustrated in Fig. 2. This yielding connection is provided to permit the gauging die 20 to be held in proper "receiving" position for a period of time during which the pitman may move slightly to the right.

The die 20 must be held in proper alignment with the feeding mechanism in order that the tapered pin may be driven into it. For this purpose a stop 36 (Fig. 2) is mounted on base plate 37 in position to contact the end of carrier 22 of the slide 21 carrying the die so that, as the pitman moves to the right, the die is arrested in "receiving" position. The parts are arranged so that the die is stopped while the wrist pin 25 to which the pitman is connected is moving through the vertical portion of its arc with the result that, even though the wrist pin may move through a considerable arc, the pitman will move to the right only very slightly. This slight movement is taken care of by the yielding connection above described which permits the pin 30 to move relative to the slide 21, the die 20 remaining in "receiving" position under the tension of springs 35.

From the description of the operating means for the slide 21, it will be clear that the slide is moved to the left under spring tension, that the extent and rapidity of its movements to the left are controlled by the pitman 24, and that the slide is returned to the right by the pitman 24 through a yielding connection, the springs 35 being strong enough to maintain the plunger 34 in the position of Fig. 2 under ordinary circumstances.

Pin feeding mechanism

The mechanism associated with the hopper for delivering the pins to the machine is driven by different connections than the rest of the machine but from the same shaft 14 so that all the parts are synchronized to operate together. For convenience, the hopper and its associated parts will be described first and they will be referred to as the delivery mechanism although these parts form a part of the feeding mechanism in that the pins are taken from the hopper, delivered to the machine, and placed in the die by automatic mechanism, which, in general terms, constitutes the feeding mechanism.

The delivery mechanism is driven by the shaft 14 through a cam 40 which oscillates an arm 41 that drives the mechanism associated with the hopper 15 for taking the pins from the hopper and delivering them one by one to the inclined bottom of a delivery chute 42. The sides of this chute converge into a narrow passageway 43 that terminates near the receiving chamber of the machine. It is not considered necessary to describe the mechanism for taking the pins from the hopper 15, said mechanism being described in copending application, Serial No. 349,299, filed March 23, 1929. The chute 42 is inclined as illustrated in Fig. 9, and the tapered pins are delivered to the top of it by one in horizontal position and transverse to the longitudinal axis of the chute. The pins roll down the chute and, since the larger and heavier ends will travel farther and faster than the smaller, the pins roll in a curve until they are arrested by the side edges of the chute in a substantially longitudinal position with the larger ends downward. They then slide into the narrow passageway from which they drop onto the receiving plate by gravity.

As the pins leave the chute 42, they slide into a receiving chamber comprising a slot 44 (Fig. 4) in a plate 45 slidably mounted on base plate 46. The longitudinal movement of the pins is limited by an adjustable stop 47 and they are positioned laterally by the edge of the slot 44 and an adjustable push plate 48, the adjustment of the stop 47 and the plate 48 permitting the receiving chamber to be adjusted to various sizes for different diameters and lengths of pins.

Figure 7:
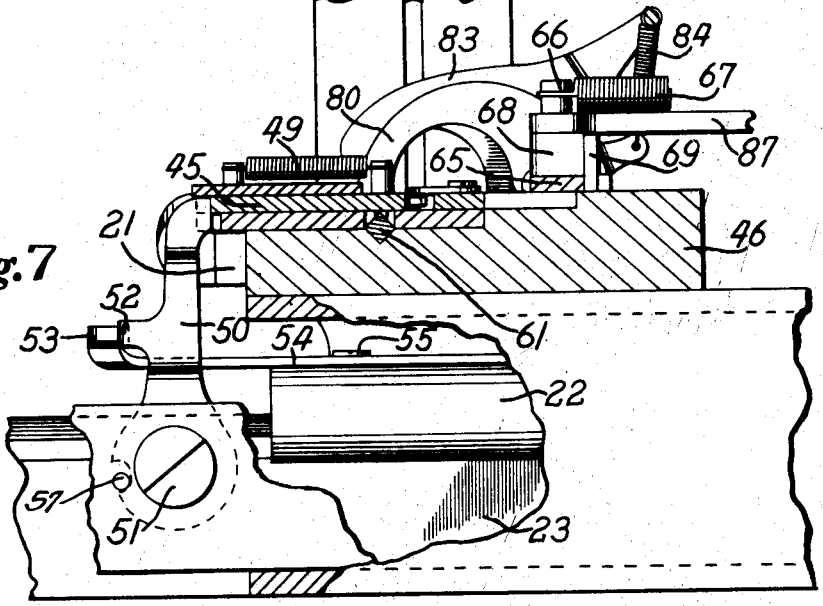
Fig. 7 is a partial section on the line 7—7 of Fig. 4.

The sliding plate 45 is urged to the left, as viewed in Fig. 4, by a spring 49 but, when the parts are in the position of Fig. 4, the slide is held to the right by means of a lever 50 pivoted at 51 (Fig. 7), one end of this lever engaging the end of the slide 45. The lever 50 has an offset lug 52 (Fig. 7) positioned in the path of a lug 53 on a flat bar 54 mounted by means of a pin and slot connection 55 (Fig. 5) on the carrier 22 supporting the slide 21, the bar 54 being urged to the right, as viewed in Fig. 5, by a spring 56. The parts are proportioned so that, as the slide 21 moves to the right from the position of Fig. 5, the lug 53 on bar 54 strikes the lug 52 on lever 50, and the latter engages the end of plate 45 to slide it to the position of Fig. 4, the spring 56 being stronger than the spring 49. Conversely, when the slide 21 moves to the left from its Fig. 4 position, the lug 53 releases the lever 50 and slide plate 45, whereupon the spring 49 moves the slide 45 to the left. The lever 50 is limited in its movement by a limit stud 57 (Fig. 7).

Referring to Figs. 1 and 4, it will be observed that when the slide 45 is in the position there shown, the receiving chamber comprising the slot 44 with the adjustable stop 47 and plate 48 is in line with the delivery passage of the chute 42. When the receiving chamber is thus opposite the delivery passage, one of the tapered pins passes into the receiving chamber till arrested by the stop 47. The succeeding pin bears against the end of the pin that has entered the chamber, the line of division being such that, as the slide plate 45 moves to the left from its Fig. 4 to its Fig. 5 position, the push plate 48 passes in front of the end of the next pin in the delivery passage so as to hold the pin in said passage until the receiving chamber has been returned into alignment with the passage.

Figure 5:
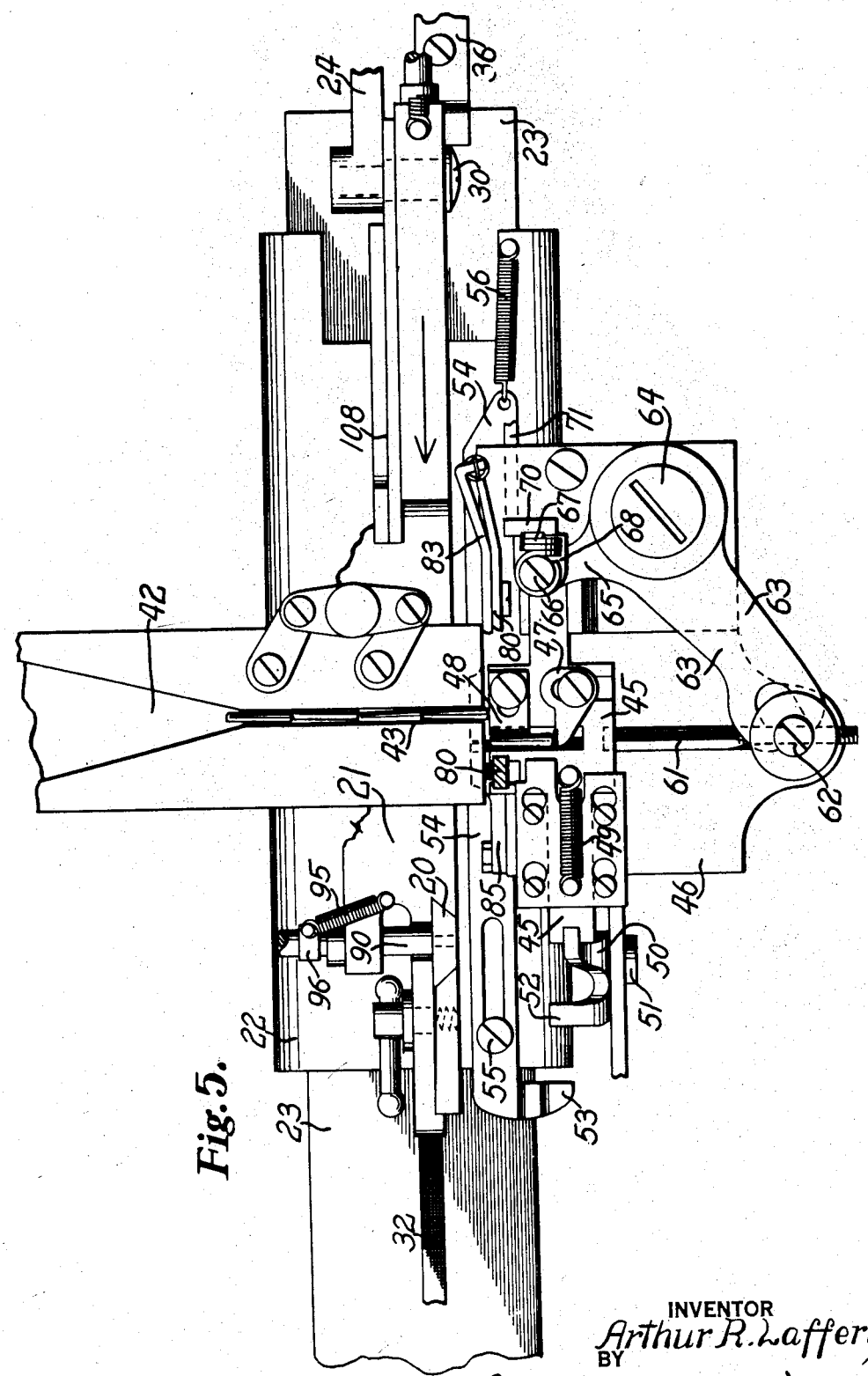
Fig. 5 is a partial plan view similar to Fig. 4 showing the parts in the positions they occupy when a tapered pin has been moved from the receiving chamber into the firing chamber at the end of the first half stroke of the machine.

When the slide plate 45 is released, and as it moves to the left from its Fig. 4 to its Fig. 5 position under the tension of spring 49, the pin in the receiving chamber is moved with it until it drops into a recess 60 (Fig. 8), which, for purposes of convenience, will be termed the firing chamber or magazine. This firing chamber is in line with the opening in the gauging die 20 when the gauging die is arrested in its "receiving" position by the stop 36 (Fig. 2). When the pin is in this firing chamber it is in position to be discharged into the gauging die.

In order to drive the pin into the die a firing hammer 61 (Figs. 4 and 5) is used which is slidably mounted in the firing chamber 60. The outer end of this hammer carries a stud 62 engaged in a slot in one arm 63 of a bell crank lever pivoted at 64. The other arm 65 of this lever has a stud 66 on it to which is connected one end of a spring 67 that urges the bell crank lever 63—65 clockwise. Mounted on stud 66 is a collar 68 (Fig. 11) having a flat portion 69 which, when the parts are in normal position, is behind a latch plate 70 slidably mounted in a frame plate. The latch 70 may be moved downward to release the collar 68—69 and its stud 66 by means of a lever 71 pivoted to the frame plate and having a pin and slot connection with a rod 72. The lever 71 is urged clockwise toward latching position by a spring 73. The rod 72 has a collar 74 fixed to it against which bears one end of a spring 75, the other end of which bears against a slidable sleeve 76 which bears against the end of the pivoted lever 71. This provides a connection such that, when the rod 72 is thrust to the left, as viewed in Fig. 11, the pivoted lever 71 is rocked counter-clockwise through a connection that may yield if the parts become blocked. Referring to Figs. 2 and 3, the connecting rod 72 is connected at its outer end to a pawl 77 pivoted on a stud 78 carried by a vertical frame plate or standard 78ª (Fig. 1). The end of pawl 77 is positioned so as to be engaged by a roller 79 on the wrist pin 25.

As the wrist pin 25 with its roller 79 moves clockwise from the position of Fig. 2, the gauging die 20 is held against the stop 36 and it will continue to be so held until the wrist pin is moved from its Fig. 2 position to an extent sufficient to begin movement of the pitman 24 to the left. Before the slide 21 begins to move to the left, the roller 79 strikes the end of the pivoted pawl 77 and moves the rod 72 to the left. This rocks the lever 71 counter-clockwise and lowers the latch 70 thereby releasing the bell crank lever 63—65 and allowing the spring 67 to quickly move the lever clockwise to drive the hammer 61 against the pin in the firing chamber to drive the pin into the die 20.

Although the moving of a pin from the receiving chamber into the firing chamber was described first it will be understood that this action really does not take place until after a pin that was moved into the firing chamber in a preceding operation has been fed into the die. The sequence of these operations will be explained in more detail in describing a complete operation of the machine.

In order to guide the pin and prevent it from being displaced vertically while it is being driven into the gauging die, a curved guide 80 is provided (Fig. 8) having a free end which is positioned in a slot 81 (Fig. 6) in the slide 45. The free end of the guide 80 is positioned just above the tapered pin so as to prevent it from jumping upwardly while being driven into the die. The guide is slidably and pivotally mounted on a stud 82 carried by a vertical plate 83 on the base plate 46 and it is urged counterclockwise by a spring 84. Inasmuch as the free end of the guide projects into a slot in the slide plate 45 the guide moves to the left with the slide plate. The bottom face of the guide 80 is straight at the rear in order to hold the pin from displacement and it curves upwardly at the front to permit the firing hammer 61 to pass beneath it as said hammer drives the pin rearward into the gauging die, the guide 80 moving clockwise slightly as the firing hammer moves beneath it.

Figure 6:
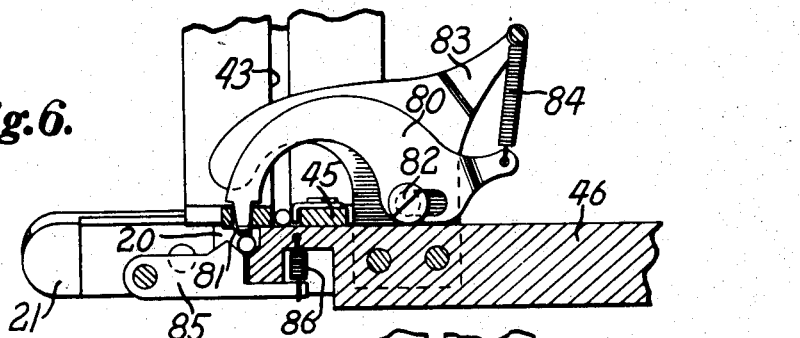
Fig. 6 is a partial section on the line 6—6 of Fig. 4.

The edge of the sliding plate 45 adjacent the gauging die is positioned reasonably close to the die so that the pin will be properly guided from the firing chamber into the die. It may happen, however, that one of the pins is considerably oversize, in which event the pin would not enter the die very far and its larger end would still remain in the slot 60. If this should occur, the movement of the gauging die to the left would be blocked by the end of the pin that remained in the firing chamber with resulting damage to the pin or the machine. To provide against this contingency a portion of the plate 45 has been cut away and a pivoted member 85 (Figs. 5, 6 and 8) is positioned in the cut away portion, said pivoted member being urged in a counterclockwise direction by a spring 86 (Fig. 6). This pivoted member forms the side wall of the firing chamber adjacent the gauging die and on the side toward which the gauging die is to be moved. If one of the pins should still project into the firing chamber when the die is moved, no damage can result because the member 85 will yield and permit the pin to pass over it.

The firing mechanism is recocked through a link 87 which is connected at its right hand end, as viewed in Fig. 2, to one end of a cam lever 88 pivoted at 89 to the standard 78ª supported by the base plate 37. A bell crank lever having an offset arm 126 is pivoted at 127, the other arm of the lever being in the plane of the lever 88. The bell crank lever is urged clockwise by a spring 128. As the wrist pin 25 with its roller 79 moves clockwise, and after the firing mechanism has been released by the pawl 77 heretofore described, the roller 79 strikes the offset arm 126 of the bell crank lever 126—129 and rocks it clockwise to cause its arm 129 to engage the lever 88 and rock the latter counterclockwise. This thrusts the link 87 to the left and moves the bell crank 63—65 counterclockwise to the position of Figs. 4 and 11, whereupon the lever 71 projects the latch 70 in front of the collar 68—69, the roller 79 having passed the pawl 77 so that the latter is free to move. When the roller 79 passes beyond the arm 126 the spring 128 restores the bell crank lever 126—129 to normal.

*Indexing mechanism*

When a tapered pin is driven into the gauging die 20, its end engages a spring pressed plunger 90 (Figs. 9 and 10) mounted in a frame like extension of the slide 21. This extension frame comprises two laterally extending members 91 and 92 joined by a longitudinal member 93 an extension 94 of said longitudinal member forming a support for the outer end of plunger 90. The extension frame moves with slide 21 and may be treated as a part of it. The plunger 90 is urged toward the die 20 by a spring 95 (Fig. 4) and the plunger has a double stop portion 96 (Fig. 9) extending both above and below the body of the plunger for a purpose that will appear later.

It will be clear that the extent to which the plunger 90 is pushed away from the gauging die, or to the right as viewed in Fig. 10, will depend upon the size of the pin that is driven into the die. For example, if the pin is of exactly the desired size, the plunger will be moved a certain distance to the right in Fig. 10, whereas, if the pin is of larger diameter or taper than desired, the plunger will not be moved as far as it normally should be. On the other hand, if the pin is of smaller diameter or taper than desired, the plunger will be moved farther to the right than it normally should be.

After a pin has been fed into the gauging die and after the plunger 90 has been positioned, the gauging die is moved to the left from its Fig. 4 position and such movement continues until the stop 96 on the plunger strikes one of the steps 97 on the stepped plate 98 as shown in Fig. 12, the particular step engaged depending upon how far the plunger has been projected by the pin and therefore depending upon the diameter and taper of the pin. When the stop 96 strikes a step of the plate 98, movement to the left of the gauging die and the slide 21 carrying it is arrested. This does not arrest movement of the pitman 24 with its pin 30 because of the pin and slot connection between the pitman and the slide 21.

After the gauging die has been stopped in a differential position which may be termed its "discharging" position, it is desirable to have it remain in position while the pin is being ejected. Accordingly, means has been provided for insuring that it will not move while the pin is being ejected. Such means comprises a lock or latch in the form of a pawl 100 (Figs. 13 and 15) adapted to engage a toothed rack 101 supported by the base plate 37. This pawl is pivoted at 102 on the end of a lever 103 that, in turn, is pivoted at 104 on the cross member 92 of extension frame of slide 21. The pawl is urged clockwise by a spring 105 into engagement with a shoulder 106 on lever 103 (Fig. 15). The lever 103 is urged counterclockwise by a spring 107 and it normally occupies a position such that the pawl 100 occupies the dot and dash position of Fig. 15. Connected to the pin 30 reciprocated by pitman 24 is a plate 108 having a recessed edge 109 provided with a cam end or nose adapted to engage the end of the lever 103 (Fig. 16). When the slide 21 carrying the gauging die is arrested as above described, the pitman 24 continues to move to the left, which moves the plate 108 relative to slide 21 whereupon the cam nose of the edge 109 of plate 108 cams the lever 103 against the tension of the spring 107 to move the pawl 100 into engagement with teeth of rack 101, the pawl cooperating with the teeth to hold the slide 21 in the position in which it has been arrested.

Ejecting mechanism

The ejecting mechanism comprises a hammer in the form of a pivoted lever 110 (Fig. 12) having a roller head 111 positioned to engage the end of the plunger 90. The hammer is urged in a counterclockwise direction by a spring 112 and it is normally latched against movement by a lever 113 urged counterclockwise to latching position by a spring 114. The forward end of the lever 113 is in the path of the plate 108 operated by the pitman 24. After the slide 21 carrying die 20 has been arrested as above described and after the latch lever 103 has been moved to latch the slide 21 in position, the plate 108 engages the end of lever 113 and rocks it clockwise against the tension of spring 114 to release the ejecting hammer 110. When this occurs, the spring 112 fires the hammer into engagement with the plunger 90 and the plunger drives the pin out of the gauging die.

The ejecting hammer is recocked during the return movement of the pitman 24 by means of an incline 115 over which the roller 111 moves in moving from the position of Fig. 12 to that of Fig. 4. This movement rocks firing lever 110 clockwise against the tension of its actuating spring 112. The end of lever 110 is cam shaped at 124 and this cam surface enables it to pass the latch lever 113 and arrive at a position where it will be automatically relatched by said lever 113, the spring 114 moving the offset end of lever 113 over the end of the lever 110 to lock the latter in position where it is ready for the next operation.

Positioned adjacent the various differential positions of the gauging die is a series of receiving chutes 120 (Fig. 12) which lead to different receptacles 121 closed by removable gates 122. It will be obvious that inasmuch as the differential position of the receiving die is determined by the size of the tapered pin that is being gauged, pins of the same size will be ejected into the same chute so that each of the receptacles will contain only pins of a given size. Twelve of these chutes are illustrated in the drawings but this number can be varied. The pins to be sorted vary in diameter to a maximum of about five thousandths of an inch (.005″) and the differentially arranged shoulders of the stepped plate 98 are arranged, in the machine illustrated, for sorting twelve different sizes of pins. There are ten steps on plate 98 for sorting usable pins. The right hand end of plate 98 also acts as a stop to position the die to discharge non-usable undersize pins in the right hand chute which is reserved for them. Pins which are non-usable because oversize are carried beyond the last step of plate 98, the carrying die 20 being arrested by a lateral extension on the end of plate 98 so as to position the die to discharge the pins into the left hand chute. Accordingly, pins which are too small and those which are too large for use are discharged as "rejects", the difference being about five thousandths of an inch (.005″). Between these limits the pins are graded in ten sizes for differences in diameter of one-half of one-thousandth of an inch. This is a much finer grading than is possible by hand.

The stepped plate 98 may be adjusted by means of a set screw 123 (Fig. 14), suitable marks 125 (Fig. 1) being provided for determining the adjustment.

Operation

Although the operation of the machine should be clear from the description heretofore given of its various mechanisms, a recapitulation may be of assistance, particularly in connection with the sequence of the different operations.

The pins to be sorted are placed in bulk in the hopper 15 and the machine started by throwing in the clutch by means of the hand operated member 13. As the machine operates the pins are automatically taken from the hopper one at a time, delivered to the chute 42 which arranges them with their larger ends downward, and they are then delivered by the chute to the receiving chamber 44. The first pin passes into the receiving chamber and the one behind it is arrested by the first. As the driving disk 26 rotates clockwise the pitman 24 moves to the left and, disregarding the firing mechanism for the moment, the slide 45 is released for movement to the left by its spring 49 and the pin in the receiving chamber is moved into the firing chamber where it remains during the reciprocation of the slide 21, no gauging operation taking place until after one of the pins has been positioned in the firing magazine.

When the slide 21 returns to the right the gauging die 20 is arrested in a position by stop 36 such that its opening is in line with the recess 60 of the firing chamber in which a pin now rests. At that time the parts are in the position illustrated in Fig. 9. As the driving disk continues to rotate the roller 79 on wrist pin 25 strikes the pawl 77, thrusts the rod 72 to the left, and thereby releases the bell crank 63—65 which fires the hammer 61 and the hammer, in turn, drives the pin from the firing chamber into the gauging die 20. As previously explained, this differentially positions the plunger 90 and such action occurs while the gauging die is still in line with the firing chamber and before the slide 21 has moved to the left. As the wrist pin 25 continues to move the slide 21 moves to the left carrying the bar 54 with it and releasing the slide plate 45 which is moved to the left by its spring 49. This moves the next pin from the receiving into the firing chamber. As the wrist pin continues its movement, the roller 79 strikes the arm 126 and moves the cam lever 88 to thrust the link 87 to the left to re-cock the firing mechanism. The gauging die continues to move to the left until it is arrested in differential position. When this occurs the plate 108 moves the pawl 100 into position to hold the slide 21 where it has been arrested. As the pitman 24 continues to move to the left and the plate 108 engages the lever 113 and trips the firing hammer 110 which strikes the plunger 90 and ejects the pin from the gauging die into the receptacle opposite the position in which the die has been arrested, the pin sliding down one of the chutes 120 into its receptacle.

After this has occurred the pitman starts moving to the right again which moves the slide 108 to the right thereby releasing the lever 113 and the latch 100, both of which automatically move to normal position. The pitman then picks up the slide 21 and moves it to the right thereby carrying the firing lever 110 to the right, roller 111 rolling over the incline 115 and recocking the ejecting mechanism. As the slide 21 continues to move to the right the plate 54 engages the lever 50 and moves the slide 45 back to position to receive another pin from the delivery chute 42. The gauging die 20 is arrested by the stop 36 in line with the firing chamber and, as soon as the wrist pin 25 moves far enough to engage the pawl 77, the operations above described are repeated.

In this manner, the tapered pins are taken from the hopper, arranged with their larger ends in one direction, automatically fed into a receiving chamber, then into a firing chamber, then into a gauging die from which they are ejected into different receptacles depending upon the diameter and taper of the pin. The operation is entirely automatic and the machine needs no attention from an operator other than to keep the hopper filled with pins and to see that the machine is correctly adjusted. The pins are rapidly and automatically sorted into sizes which differ from one another only one-half of one-thousandth of an inch.

Although the machine has been illustrated and described for use in sorting tapered pins, it may be used equally well for sorting tapered rollers for roller bearings, and tapered articles of other kinds. In fact, it can be used for sorting articles which are not tapered such, for example, as ball bearings. In sorting articles of this kind the opening in the gauging die can be made tapered and of such a size that a ball of a given diameter will project beyond the die a given distance. It will be readily appreciated that balls of other diameters will project more or less through such a die and will position the plunger 90 in differential positions depending upon the size of the ball. The machine will perform in exactly the same way in ejecting the balls from the die into different receptacles depending upon the position in which the die is arrested. In using the machine with different articles the size of the gauging die and the size of the receiving and firing chambers can be altered to suit the requirements of the particular article that it is desired to gauge, such changes being easily possible.

It is to be understood that the structure shown is for purposes of illustration and that variations may be made in it without departing from the spirit and scope of the invention as defined in the appended claims.

I claim:

1. In a machine of the class described, a gauging die, automatic means for arranging tapered articles with their smaller ends toward said die and for feeding them into the die, a stop mechanism set by the positioning of the tapered article in the die, means for moving said die to differential discharging positions determined by the setting of said stop mechanism, and ejecting means for automatically ejecting the tapered article from the die when the die reaches its differential position.

2. In a machine of the class described, a hopper for receiving articles in bulk, a gauging die, automatic means for taking said articles from said hopper and feeding them one at a time into said die so that each article assumes a position in the die corresponding to its size, a plurality of receptacles each adapted to receive articles of a given size, means for moving said die from a receiving to a discharging position adjacent said receptacles, differential mechanism automatically controlled by the position of the article in the die for arresting said die in differential positions, and means for automatically ejecting said article from said die after the die has reached its differential position.

3. In a machine of the class described, a hopper for receiving articles in bulk, a gauging die, automatic means for taking said articles from the hopper and feeding them into said die, a stop mechanism set by the position of the article in the die, mechanism for moving said die to differential positions determined by the setting of said stop mechanism, a receptacle adjacent each differential position of the die, and means for automatically ejecting the article from the die when the die reaches its differential position to thereby deposit the article in a receptacle corresponding to the size of the article in the die.

4. In a machine of the class described, a hopper for receiving articles in bulk, a gauging die, means for automatically taking said articles from the hopper and feeding them into said die, a stop mechanism set by the position of the article in the die, means for automatically moving said die to differential discharge positions determined by the setting of said stop mechanism, a receptacle adjacent each discharge position of the die, a latching device acting to latch the die in the differential position in which it is arrested, and means acting to automatically eject the article from the die after the latter has been latched in position.

5. In a machine of the class described, a hopper for receiving tapered articles in bulk, a gauging die, automatic means for taking said articles from said hopper and arranging them with their smaller ends in one direction and feeding them into said die, a stop mechanism set by the positioning of said articles in said die, means for automatically moving said die to differential positions determined by the setting of said stop mechanism, and ejecting means acting to automatically eject the article from the die after the latter has reached its differential position.

6. In a machine of the class described, a movable gauging die, means for moving said die back and forth between a receiving position and different discharging positions, mechanism for automatically feeding articles into said die while it is in receiving position, a stop mechanism set by the article in the die for arresting said die in different discharging positions depending upon the size of the article in said die, and means released by said die moving means acting to automatically eject the article from said die when the die reaches its discharging position.

7. In a machine of the class described, a reciprocable gauging die, operating means for moving said die back and forth between a receiving position and different discharging positions, mechanism for automatically feeding an article into said die while the die is in receiving position, said article projecting through the die, a spring-pressed plunger set by the projecting portion of the article in the die, a stepped stop for engaging said plunger when the die is moved toward discharging position to stop the die in different positions depending upon the distance the article projects through the die, and means automatically ejecting the article from the die when the die is arrested in a discharging position.

8. In a machine of the class described, means for automatically feeding articles into a receiving chamber, means acting to automatically move said articles from said receiving chamber to a firing chamber, means acting to fire said articles from said firing chamber into a gauging die, means for moving said gauging die to differential positions controlled by the position of the article in said die, and mechanism acting to automatically eject said article when said die reaches its differential position.

9. In a machine of the class described, means for automatically arranging tapered articles with their smaller ends in a given direction and for feeding them into a receiving chamber, means for automatically moving them from said receiving chamber into a firing chamber, means for automatically firing said articles from said firing chamber into a gauging die, means for automatically moving said gauging die into differential positions controlled by the position of the article in the die, and mechanism acting to automatically eject said article from said die after it reaches its differential position.

10. In a machine of the class described, a hopper for receiving tapered articles in bulk, automatic means for taking said articles one at a time from said hopper and arranging the same with their smaller ends in one direction and delivering them one at a time into a receiving chamber, means for moving the article from the receiving chamber to a firing chamber, a gauging die, mechanism for driving the article in the firing chamber into said gauging die, means for moving the gauging die from its receiving position to discharged positions, a stop mechanism set by said article when driven into said die, said stop mechanism acting to arrest said die in differential discharging positions, and means acting to automatically eject the tapered article from the die when the latter is arrested in a discharging position.

11. In a machine of the class described, a movable gauging die, an operating means for moving said die from a receiving position to discharging positions and vice versa, a receiving chamber for receiving articles from a source of supply, a firing chamber, means for automatically moving the article from the receiving to the firing chamber, a hammer released automatically by said operating means for driving said article from the firing chamber into said gauging die, a spring-pressed plunger positioned by said article when driven into said die, a stepped stop for engaging said plunger when the die is moved toward discharging position to thereby arrest the die in differential discharging positions dependent upon the size of the article in the die, means acting to automatically eject the article from the die after the die reaches discharging position, and a receptacle opposite each discharging position of the die for receiving the articles discharged from the die.

12. In a machine of the class described, a movable gauging die, a power-operated slide for moving said die from receiving position to discharging positions and vice versa, said slide being movable relative to the die, means for automatically feeding an article into said die while the die is in receiving position, mechanism for arresting said die in differential discharging positions dependent upon the size of the article in the die, and means released by the continued movement of said slide after the die has been arrested for ejecting the article from the die.

13. In a machine of the class described, a movable gauging die, a power-operated slide for moving said die from receiving position to discharging positions and vice versa, said slide being movable relative to the die, means for feeding an article into said die while it is in received position, mechanism for arresting said die at differential positions depending upon the size of the article in the die, a locking means for locking the die in its discharging position, and means released by movement of said slide after the die has been arrested for ejecting the article from the die.

14. In a machine of the class described, a hopper for receiving articles in indiscriminate position, a gauging die, automatic means for taking said articles from said hopper and feeding them one at a time into said gauging die so that each article occupies a position in said die corresponding to its size, a plurality of receptacles each adapted to receive articles of a given size, means causing relative movement between said die and receptacles to selectively register the die and the receptacles, stop mechanism set by the position of the article in the die automatically arresting relative movement between the die and the receptacle for the article of the size that is in the die, and means acting to automatically eject said article from said die when the die and the selected receptacle are registered.

15. In a machine of the class described, a hopper for receiving tapered articles in indiscriminate position, a gauging die, automatic means for taking said articles from said hopper and feeding them into said die with the smaller ends of the articles entering the die first, a plurality of receptacles for receiving articles of different sizes, means for causing a differential relative movement between the die and the receptacles to selectively register the die and receptacles, automatic stop mechanism set by the position of the article in the die for arresting said relative movement when the die is in registration with the receptacle for articles of the size of the one in the die, and means acting to automatically eject the article from the die when the die and the chosen receptacle are in registration.

16. In a machine of the class described, a gauging die, means for feeding articles into said die so that they occupy positions therein dependent upon their size, a plurality of receptacles, means causing relative movement between said die and receptacles to selectively register the die and said receptacles, stop mechanism for arresting said relative movement set by the position of said article in said die, and means acting to automatically eject said article when said relative movement has ceased.

17. In a machine of the class described, a gauging die, means for feeding articles into said die so that they are positioned therein according to their size, a plurality of receptacles, means for moving said die and the article therein relative to said receptacles to selectively register said die with said receptacles, means for arresting the movement of said die controlled by the position of the article in said die, and means acting to automatically eject said article when said die has been arrested.

18. In a machine of the class described, a gauging die, means for automatically positioning tapered articles with their small ends toward said die, means automatically feeding said positioned articles into said die so that they occupy positions dependent upon their size, a plurality of receptacles, means causing relative movement between said die and receptacles to selectively register said die and receptacles, stop mechanism for arresting said relative movement set by the position of said tapered article in said die, and means automatically ejecting said tapered article when said relative movement has been arrested.

19. In a machine of the class described, a gauging die adapted to occupy a feeding position, means for feeding articles into said die so that each article occupies a position in said die dependent upon its size, means for moving said die directly from its feeding position to a discharge position for the article in the die, means controlled by the position of the article in said die for arresting said die in discharging position, and means acting to automatically eject said article from said die when the die has been arrested in its discharge position.

20. In a machine of the class described, a gauging die adapted to occupy a feeding position, means for automatically arranging tapered articles with their small ends toward said die, means for feeding tapered articles into said die with their small ends entering first so that the articles occupy a position dependent upon their size, means for moving said die directly from its feeding to a discharging position for the article in the die, mechanism controlled by the position of the tapered article in said die automatically arresting said die in discharging position, and means acting to automatically eject said article from said die when the die has been arrested in its selected position.

21. In a machine of the class described, a gauging die movable from a receiving position to a selected one of a plurality of discharge positions, automatic means for feeding articles into said die while it is in receiving position, means for maintaining said die stationary while an article is being fed into said die, means responsive to the position of the article in the die to select a discharge position, operating means for moving said die directly and continuously from its receiving position to the selected discharge position, ejecting mechanism released by said operating means for automatically ejecting said article when the die reaches said selected discharge position, and means operated by said operating means for resetting said ejecting mechanism when said die is returned to its receiving position.

ARTHUR R. LAFFERTY.